United States Patent
Morsch et al.

(10) Patent No.: US 10,641,674 B2
(45) Date of Patent: May 5, 2020

(54) SENSOR DEVICE PARTICULARLY FOR MARITIME APPLICATIONS

(71) Applicant: HYDAC ELECTRONIC GMBH, Saarbruecken (DE)

(72) Inventors: Joachim Morsch, Marpingen (DE); Tobias Erath, Niedervisse (FR)

(73) Assignee: HYDAC ELECTRONIC GMBH, Saarbruecken (DE)

( * ) Notice: Subject to any disclaimer, the term of this patent is extended or adjusted under 35 U.S.C. 154(b) by 157 days.

(21) Appl. No.: 15/756,181

(22) PCT Filed: Aug. 12, 2016

(86) PCT No.: PCT/EP2016/001388
§ 371 (c)(1),
(2) Date: Feb. 28, 2018

(87) PCT Pub. No.: WO2017/041873
PCT Pub. Date: Mar. 16, 2017

(65) Prior Publication Data
US 2018/0313712 A1   Nov. 1, 2018

(30) Foreign Application Priority Data

Sep. 12, 2015 (DE) .................. 10 2015 011 974

(51) Int. Cl.
*G01L 19/14*  (2006.01)
*G01L 19/06*  (2006.01)

(52) U.S. Cl.
CPC ........ *G01L 19/149* (2013.01); *G01L 19/0618* (2013.01); *G01L 19/144* (2013.01)

(58) Field of Classification Search
CPC . G01L 19/149; G01L 19/0618; G01L 19/144; G01L 19/06; G01L 5/00; H01L 23/495; B06B 61/0603
See application file for complete search history.

(56) References Cited

U.S. PATENT DOCUMENTS

| 3,489,995 A | 1/1970 | Laurent |
| 2005/0204823 A1 | 9/2005 | Murai |
| 2012/0042734 A1 | 2/2012 | Wade et al. |

FOREIGN PATENT DOCUMENTS

| DE | 28 18 470 | 11/1979 |
| DE | 43 35 588 | 9/1996 |
| DE | 196 10 167 | 2/1997 |

(Continued)

OTHER PUBLICATIONS

International Search Report (ISR) dated Oct. 25, 2016 in International (PCT) Application No. PCT/EP2016/001388.

*Primary Examiner* — Harshad R Patel
*Assistant Examiner* — Nigel H Plumb
(74) *Attorney, Agent, or Firm* — Wenderoth, Lind & Ponack, L.L.P.

(57) ABSTRACT

A sensor device, particularly for maritime applications, includes a housing (1) with a pressure connection (7) leading to a pressure sensor (9) that transmits measurement data using a transmission device (17, 19), and with at least one closeable passage opening (31) for connecting the surroundings to at least parts (33) of the housing interior in which the pressure sensor (9) is arranged. The pressure sensor (9) is surrounded by an incompressible medium that is separated from the surroundings by an elastically-yielding, media-tight separating arrangement (49).

10 Claims, 3 Drawing Sheets

(56) References Cited

FOREIGN PATENT DOCUMENTS

| | | |
|---|---|---|
| DE | 297 14 322 | 1/1998 |
| DE | 198 55 000 | 11/1999 |
| DE | 102 12 767 | 10/2003 |
| DE | 102 96 693 | 11/2004 |
| EP | 2 423 656 | 2/2012 |
| GB | 1 218 672 | 1/1971 |
| WO | 03/081197 | 10/2003 |

SENSOR DEVICE PARTICULARLY FOR MARITIME APPLICATIONS

FIELD OF THE INVENTION

The invention relates to a sensor device, particularly for maritime applications, having a housing with a pressure connection leading to a pressure sensor that transmits measurement data by a transmission device, and with at least one connectable passage opening for connecting the surroundings to at least parts of the housing interior in which the pressure sensor is arranged. The invention furthermore relates to the use of that pressure sensor device in deep water applications. In deep water applications such as hydraulic function units BOP (blow out preventers) or ROV (remote operated vehicles), sensors, valves, etc. are placed in an oil-filled chamber, which is adjusted to ocean pressure level by compensators (compensated chamber).

BACKGROUND OF THE INVENTION

Sensor devices having pressure sensors for measuring media pressures are prior art, see for example DE 102 12 767 A1. In particular, such prior art devices are used for monitoring the system pressure in systems that use pressurized fluids as working media. In an encapsulated system, the ambient pressure adds up to the system pressure, which gives rise to the difficulty that in the case of high ambient pressures. The pressure sensor must then be designed for a potentially very high pressure level. Even though a much lower system pressure relative to the ambient pressure is to be monitored only a small portion of the measurement range can then be used. For solving this problem according to the prior art, the sensor housing is brought to ambient pressure so that the pressure sensor is pressurized with the ambient pressure on the one hand and with the system pressure on the other hand. As a result, the sensor only measures the system pressure. In the case of sensor devices that are exposed to atmospheric pressure, the procedure is such that the pressure compensation between outside air and air present in the sensor housing is effected via a gas-permeable pressure compensation diaphragm. Such venting diaphragms are known as pressure compensation diaphragms, and they are commercially available in the form of hydrophobic-oleophobic PTFE diaphragms. For applications in which the sensor device is situated under water, this procedure is not feasible because air or nitrogen gas in the housing is compressible, and the diaphragm is not sufficiently supported. High differential pressures on the diaphragm then lead to water penetrating the housing and damaging the electronics associated with the sensor.

SUMMARY OF THE INVENTION

With respect to these problems, an object of the invention is to provide an improved sensor device of the aforementioned generic type that permits reliable use in the case of ambient fluid pressure, for example sea water pressure in a compensated chamber (oil-filled hydraulic chamber adjusted to ocean pressure).

According to the invention, this object is basically achieved by a sensor device having, as an essential feature of the invention, a pressure sensor surrounded by a largely incompressible medium, which is separated from the surroundings by an elastically yielding, media-tight separating mechanism. An oil, such as silicone oil or transformer oil, or other incompressible material in the form of, e.g., a gel or a potting material, is advantageously provided as an incompressible medium with which a chamber containing the pressure sensor in the housing is filled. The chamber is sealed off with respect to the surroundings by the flexible, media-tight separating mechanism. The sensor device according to the invention can then also be used in a reliable manner for deep water applications, such as blow-out preventers or ROVs, e.g., on the ocean floor at a depth of about 4000 meters with an ambient pressure of 400 bar or more.

The transmission device can have a circuit board to which the pressure sensor is connected, as well as connection cables with which the circuit board can be hooked up or connected to an analysis device. Alternatively, provision can also be made for wireless radio transmission.

In particularly advantageous exemplary embodiments, the separating mechanism is configured in the nature of a rolling diaphragm of which, folded over at a deflection point, a cup-shaped inner part engages in a pot-like widening of a receiving part, at least in the initial state of the diaphragm. An elastomer, such as a nitrile butadiene rubber, can be advantageously provided as a material for the rolling diaphragm.

With particular advantage, the separating mechanism configured as an elastically yielding diaphragm is fixed by its free edge in a receiving chamber of the tubular receiving part, which chamber is constantly exposed to the ambient pressure. The pot-shaped receiving part for the diaphragm can be arranged centrally in and passing through a partition of the housing. The partition has at least one passage opening that can preferably be closed with a sealing screw.

Connection cables of the transmission device for the measurement data obtained by the pressure sensor can pass through this partition.

In particularly advantageous exemplary embodiments, another housing part, is continuously connected to the surroundings, preferably via at least one passage opening, opens in the free end of the receiving chamber of the receiving part, and adjoins the partition of the housing that seals off the housing interior towards the pressure sensor by the particular sealing screw.

This receiving part for the diaphragm can be designed as a screw-in part and can be sealingly screwed into the partition. Furthermore, the pressure sensor and the circuit board can be held in a receiving bracket or receiving basket in the housing.

The subject matter of the invention is also the use of a pressure sensor device in deep water applications, particularly in blow-out preventers. The device has a pressure sensor, which for measuring a system pressure is received in a housing with an incompressible medium. During use, the incompressible medium is exposed to the prevailing ambient water pressure by an elastically yielding separating mechanism.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
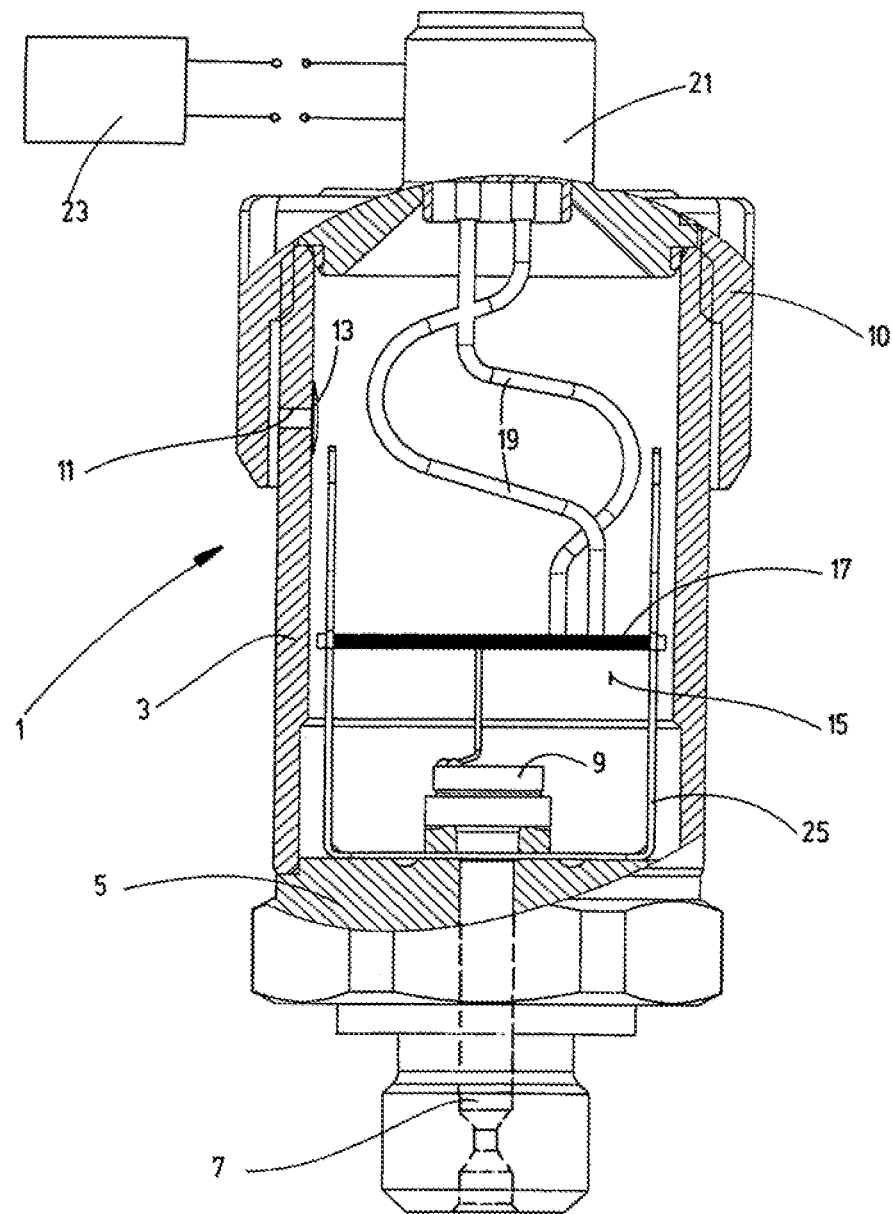
FIG. 1 is a side view partially in section of a pressure sensor device according to the prior art.

FIG. 1 shows a prior art sensor device having a metal sensor housing 1 with a circular-cylindrical main part 3. The lower end of main part 3 in FIG. 1 is sealed off by a welded-on bottom part 5. This bottom part 5 has a centrally located pressure connection 7, via which one side of the pressure measuring cell of a pressure sensor 9 arranged on the bottom part 5 can be subjected to the system pressure to be measured. The upper, opposite end of the housing main part 3 is closed in a fluid-tight manner by a screw cap 10. A pressure-compensating bore 11, which is closed by a standard gas-permeable venting diaphragm 13, is located in the wall of the housing main part 3. This diaphragm 13 can be a standard pressure compensation diaphragm made of PTFE and is applied in a self-adhesive manner to the inner wall of the housing main part 3.

As a result of the pressure compensation via the bore 11, the air or optionally other gaseous medium, such as nitrogen gas, situated in the housing interior 15 is under ambient pressure. The pressure measuring cell of the pressure sensor 9 is exposed to the system pressure by the pressure connection 7 on the one hand and is subjected to the ambient pressure on the other hand, and then only detects the system pressure as a pressure differential relative to the ambient pressure. The pressure sensor 9 is connected to a circuit board 17, from which connection cables 19 lead to a connector plug unit 21 in turn connected to an electronic analyzer 23. The plug unit 21 is arranged on the cap 10, in the center thereof. For holding the circuit board 17, provision is made of a receiving basket 25, which is secured on the inside of the bottom part 5.

Figure 2:
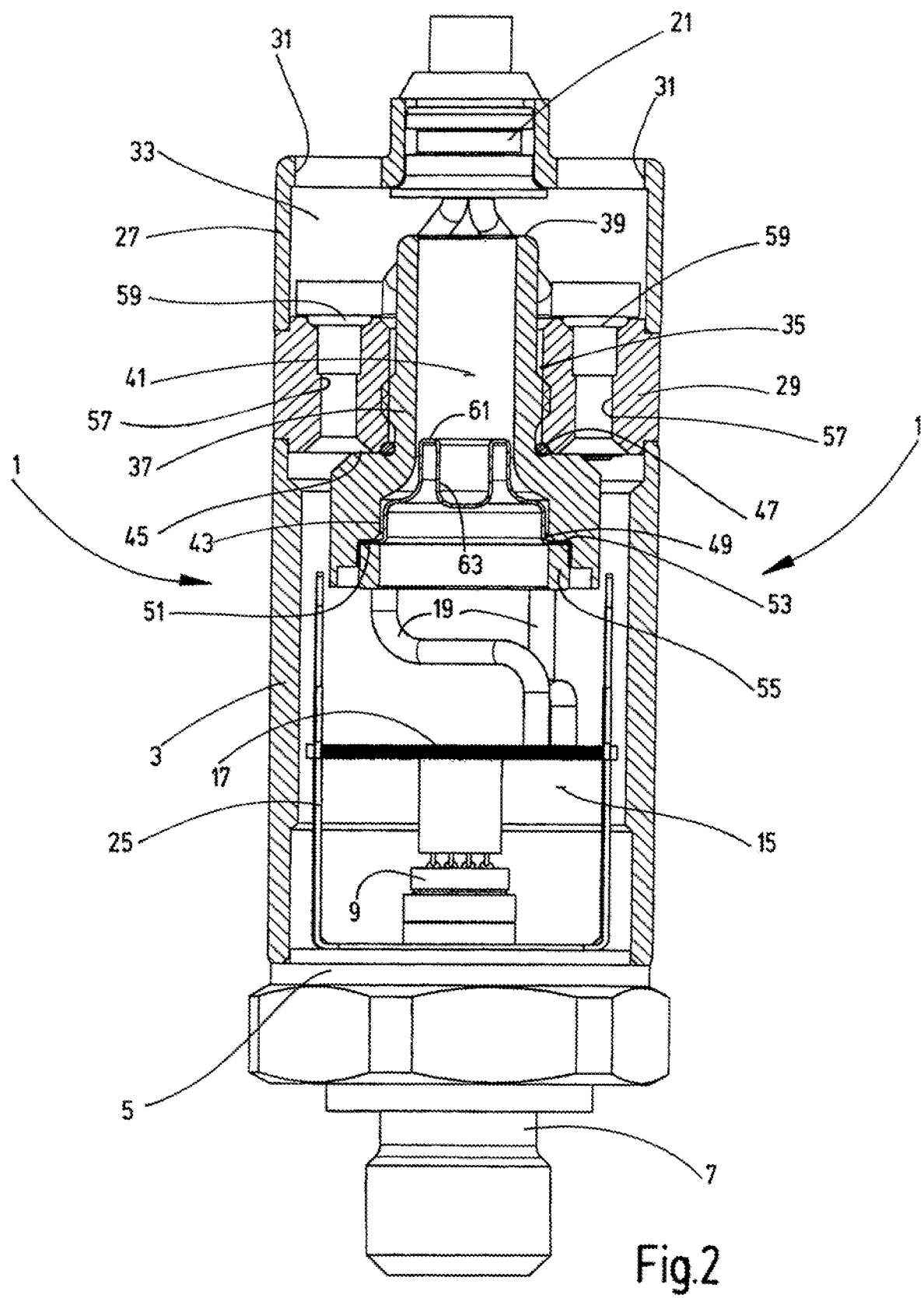
FIG. 2 is a side view partially in section of a sensor device according to an exemplary embodiment of the invention.
Figure 3:
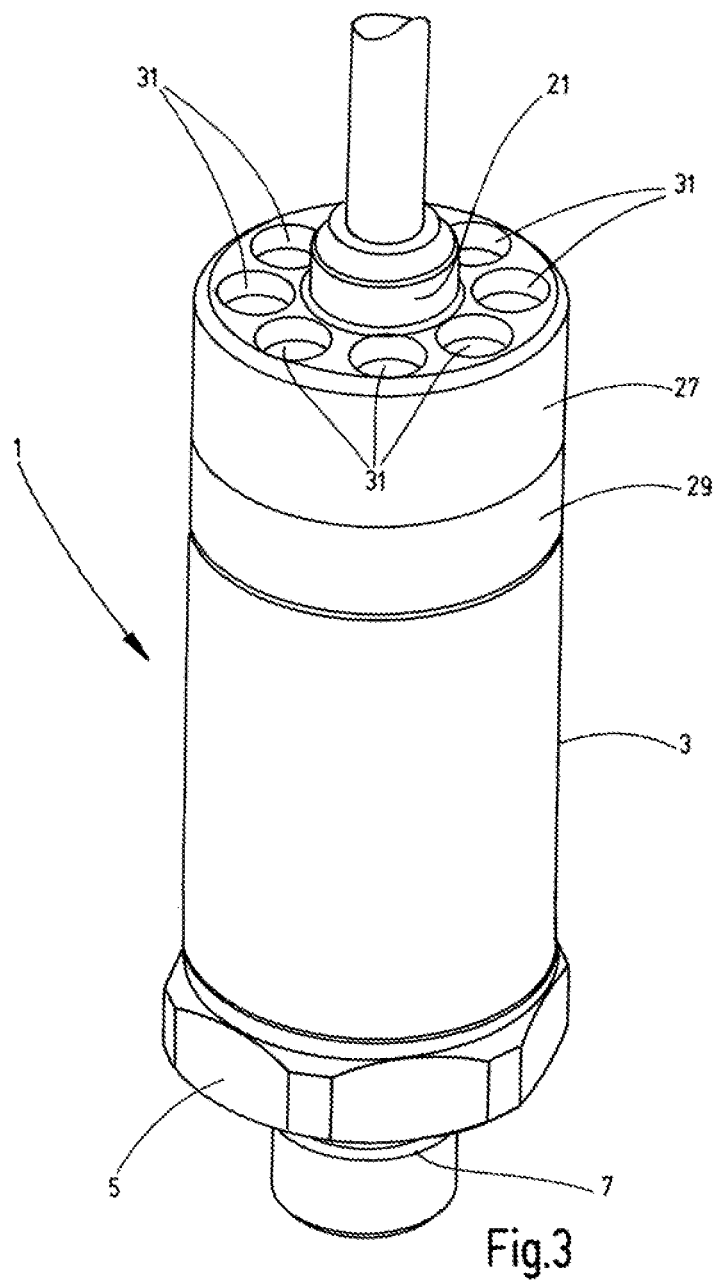
FIG. 3 is a perspective view of the exemplary embodiment of FIG. 2.

FIGS. 2 and 3 show an exemplary embodiment of the sensor device according to the invention. As is the case with the prior art device shown in FIG. 1, the sensor housing 1 has a circular-cylindrical main part 3 closed at the lower end in the drawing by a welded-on bottom part 5. A pressure connection 7 is provided on bottom part 5 for the pressurized fluid of the system pressure is to be measured. Pressure connection 7 is connected to one side of the measuring cell of the pressure sensor 9, which is arranged together with a retaining basket 25 for the circuit board 17 on the bottom part 5. A third metal housing part in the form of a partition 29 is welded to the housing main part 3 and the housing part 27, and is located between the upper end of the main part 3 and a metal housing part 27 forming the upper housing cover. The interior space 33 of the end-side housing part 27 is continuously connected to the surroundings via passage openings 31. As in the case of the cover cap 10 of the solution shown in FIG. 1, the wall of the housing part 27 having the passage openings 31 has a plug unit 21 that is connected to the circuit board 17 via connection cables 19. The cables 19 are sealingly guided through the partition 29.

Situated in the partition 29 and coaxially to the longitudinal axis of the housing is a threaded through-bore 35. A tubular receiving part 37 is screwed in bore 35 such that its upper, open end 39 is in connection with the ambient pressure-conducting interior space 33 of the upper housing part 27. The receiving part 37 then forms a receiving chamber 41 in the interior of space 33 that is continuously exposed to the ambient pressure. On the end opposite the upper end 39 of housing part 27, this receiving chamber 41 has a pot-shaped widening 43, on which is formed a radial outer shoulder 45. Shoulder 45 rests on the partition 29 and is sealed there by a gasket 47 when the receiving part 37 is screwed into the partition 29. A rolling diaphragm 49 is arranged in the pot-shaped widening 43 and is secured in such a way that the free edge 51 of the rolling diaphragm 49 is securely clamped on an inner shoulder 53 at the opening region of the receiving part 37 by a press-fit locking ring 55. By the rolling diaphragm 49 that forms a movable separator element, the ambient pressure-conducting interior space 33 in the housing part 27 is separated in a fluid-tight manner from the interior space 15 having the pressure sensor 9 and located in the housing main part 3.

The partition 29 has passage openings 57, which can be closed in a fluid tight manner by sealing screws 59. The housing interior space 15 is filled via the passage openings 57 with an incompressible medium, in the case of the exemplary embodiment with an oil that is compatible with the electronics of the circuit board 17, such as silicone oil or transformer oil. The chamber pressure of which pressurizes the measuring cell of the pressure sensor 9 on the side opposite the side subjected to the system pressure and connected to the pressure connection 7. Because the rolling diaphragm 49 forms a movable, flexible separator element between the ambient pressure-conducting space 33 and the interior space 15 containing the pressure sensor 9, diaphragm 49 transfers the ambient pressure to the chamber pressure of the space 15. The incompressible fill of the space 15 forms a rigid support for the rolling diaphragm 49. Diaphragm 49 extends from its secured edge 51 along the inner wall of the pot-shaped widening 43 of the receiving part 37 into the tapered part of the receiving chamber 41 of the receiving part, where the rolling diaphragm 49, starting from a deflection point 61 and forming a type of cup 63, extends towards the interior space 15. The rolling diaphragm 49 then forms a reliable separation point, which due to its flexibility, equalizes the ambient pressure prevailing in the chamber 33, with the chamber pressure acting on the pressure sensor 9 in the interior space 15. Because the rolling diaphragm 49 extends with a cup 63 into the interior space 15, a volume compensation can be achieved by a diaphragm movement that changes the length of the cup 23, which in turn changes the volume of the interior space 15. The changes ensure that a possible filling level deficit of the incompressible medium in the space 15 can be compensated and that the rolling diaphragm 49 is then rigidly supported in a reliable manner. As mentioned, for the fluid-tight separation, an elastomer such as nitrile butadiene rubber can advantageously be provided as a material for the rolling diaphragm 49.

While one embodiment has been chosen to illustrate the invention, it will be understood by those skilled in the art that various changes and modifications can be made therein without departing from the scope of the invention as defined in the claims.

The invention claimed is:
1. A sensor device capable of being used in maritime applications, the sensor device comprising:
   a housing having a pressure connection;
   a pressure sensor inside said housing having a first sensor side connected to said pressure connection and exposed to a system fluid pressure conveyed via said pressure connection, said pressure sensor transmitting pressure measurement data by a transmitter, said pressure sensor having a measuring cell on a second sensor side of said pressure sensor opposite said first sensor side;

a closeable passage opening extending from an exterior to an interior of said housing connecting surroundings of said housing to a pressure chamber in said interior of said housing;

an incompressible medium surrounding said pressure sensor; and an elastically yielding, media-tight separator separating fluid in said pressure chamber and the surroundings from said measuring cell.

2. A sensor device according to claim 1 wherein said pressure sensor is connected to a circuit board in said housing, said circuit board being connected to connection cables capable of being connected to an analyzer of the pressure measurement data and forming said transmitter.

3. A sensor device according to claim 2 wherein said pressure sensor and said circuit board are held in a receiving bracket in said housing.

4. A sensor device according to claim 1 wherein said separator comprises a rolling diaphragm having a cup-shaped interior part folded over a deflection point, said cup-shaped interior part being engaged in a pot-shaped widening of a receiving part at least in an initial state of said rolling diaphragm.

5. A sensor device according to claim 4 wherein said rolling diaphragm comprises a free edge secure in a receiving chamber of said receiving part, said receiving part being tubular, said rolling diaphragm being continuously exposed to ambient pressure of the surroundings.

6. A sensor device according to claim 4 wherein said receiving part is arranged centrally in said housing and extends through a partition of said housing, said partition having a passage opening closeable with a sealing screw.

7. A sensor device according to claim 6 wherein said pressure sensor is connected to a circuit board in said housing, said circuit board being connected to connection cables capable of being connected to an analyzer of the pressure measurement data and forming said transmitter; and said connection cables extend through said partition.

8. The sensor device according to claim 6 wherein said housing comprises a housing part being continuously connected to the surroundings via said passage opening and being open into a free end of a receiving chamber of said receiving part, said housing part adjoining said partition, said partition sealing a housing interior in a direction of said pressure sensor by a sealing screw.

9. A sensor device according to claim 6 wherein said passage opening has internal threads engaging said sealing screw.

10. A sensor device according to claim 1 wherein said housing is submersed in water with said pressure sensor being in a compensated chamber.

* * * * *